United States Patent
Schrötz et al.

(10) Patent No.: US 6,566,423 B2
(45) Date of Patent: May 20, 2003

(54) MIXTURES COMPRISING EPOXIDE COMPOUNDS AND THEIR USE

(75) Inventors: Markus Schrötz, Oberhausen (DE); Martin Fulgraff, Herne (DE); Peter Martischewski, Moers (DE); Jürgen Schillgalies, Moers (DE); Rolf Herzog, Bottrop (DE)

(73) Assignee: Bakelite AG (DE)

( * ) Notice: Subject to any disclaimer, the term of this patent is extended or adjusted under 35 U.S.C. 154(b) by 0 days.

(21) Appl. No.: 09/997,625

(22) Filed: Nov. 29, 2001

(65) Prior Publication Data

US 2002/0068174 A1 Jun. 6, 2002

(30) Foreign Application Priority Data

Dec. 4, 2000 (DE) .......................... 100 60 314

(51) Int. Cl.⁷ .............................. C08K 3/08; C08L 63/02
(52) U.S. Cl. .................. 523/458; 428/413; 523/466; 525/472; 525/523; 528/106
(58) Field of Search .................. 428/413; 523/466, 523/458; 525/472, 523; 528/106

(56) References Cited

U.S. PATENT DOCUMENTS

| 3,496,130 A | 2/1970 | Wasem et al. |
| 4,310,695 A | 1/1982 | Dante |
| 5,567,748 A | 10/1996 | Klein et al. |

FOREIGN PATENT DOCUMENTS

JP          09-020878      *   1/1997

OTHER PUBLICATIONS

Chemical Abstracts, Abstract of JP 09–020878, Jan. 1997.*
Lee Nevile, Handbook of Epoxy Resins, McGraw–Hill, p. 7–1, 1967.*

* cited by examiner

*Primary Examiner*—Robert Dawson
*Assistant Examiner*—D. Aylward
(74) *Attorney, Agent, or Firm*—Muserlian, Lucas and Mercanti

(57) ABSTRACT

Novel cold-curing mixtures comprising epoxide compounds, curing agents, additives and optionally further auxiliary and filler materials, which have low irritant potential, which are free of solvents and are self-levelling and which, in the cured state, are colorfast and have a surface which, in terms of optical and tactile properties, is faultless.

11 Claims, No Drawings

MIXTURES COMPRISING EPOXIDE COMPOUNDS AND THEIR USE

STATE OF THE ART

Due to their high mechanical strengths and good chemical stability, epoxy resins are often used as binding agents in coating materials. In the case of corresponding cold-curing systems, amine curing is preferred, particularly curing with amine-terminal addition products of epoxide compounds and amines. Apart from diverse solvents, such as benzyl alcohol, these addition product curing agents comprise additionally modification means and accelerators depending on the applications.

While the surfaces of correspondingly cured mixtures are continuous and smooth, they do not, in every respect, meet all the requirements for a decorative surface. Due to the production, the addition products comprise free monomeric amines which, during the curing process, migrate to the surface and there separate out and cause faults. Furthermore, the amines, which migrated to the surface, can react with moisture and carbon dioxide of the ambient air with the formation of carbamates and carbonates, which also impair the optical and tactile quality of the surface. In addition, the free amines are skin irritants or are caustic.

OBJECTS OF THE INVENTION

It is an object of the invention to provide cold-curing mixtures comprising epoxide compounds and curing agents, which mixtures, after curing, exhibit good chemical stability and high mechanical strength characteristic of epoxide resins, which are not irritating to the skin and are free of solvents, but whose viscosity is so low that they can be readily processed at ambient temperatures and which are self-levelling and, in the cured state, have an optically and tactilely faultless surface.

It is another object of the invention to provide novel objects prepared from the said mixtures having superior properties.

These and other objects and advantages of the invention will become obvious from the following detailed description.

THE INVENTION

The novel mixtures of the invention are comprised of
a) 5–50 wt. % of epoxy resin with at least two epoxide groups per molecule,
b) 1–25 wt. % of reactive thinner comprising epoxide groups,
c) 1–25 wt. % of epoxy-amine addition product with terminal amino groups,
d) 1–20 wt. % of modification means,
e) 0–80 wt. % of filler materials and additives, wherein the epoxy-amine addition product is an isolated addition product of one mole of amine and one to two equivalents of at least one epoxide compounds having up to two epoxide groups per molecule, and that the modification means is a xylene-formaldehyde resin or a mixture of xylene-formaldehyde resin with up to 60 wt. % of another modification means.

These mixtures are preferably used for the production of decorative surfaces, in particular of decorative floor coatings, of coatings in bathrooms and sanitary blocks and for the hand lay-up lamination of formed parts and for the production of composite materials with surfaces which have optically and tactilely aesthetic properties as well as with decorative surfaces, produced from the said mixtures.

A substantial improvement in the surface quality of epoxy resins cured with amine-terminal epoxy-amine addition products is attained if, as the epoxy-amine addition products, isolated addition products of one mole of amine with 1 to 2 equivalents of an epoxide compound with up to two epoxide groups per molecule are used. Such addition products are nearly odor-free and are not irritating to the skin and they are considerably more compatible with epoxide compounds than monomeric amines. Therefore, they do not migrate to the surface of a corresponding mixture and thus do not lead to faults through sequestration, efflorescence or formation of carbamates. While the cured products are slightly colored, they are colorfast, i.e. further yellowing hardly occurs.

Such isolated amine-terminal addition products of one mole of amine and one to two equivalents of at least one epoxide compound, in the following denoted only as "isolated addition products", are known from an earlier application by the applicant (german File Number 100 13 735.0). They are produced in the conversion known per se of distillable mono-, di- and/or polyamines with epoxide compounds, wherein the amines are used in at least a 10% molar excess relative to the epoxide groups of the epoxide compounds, and the subsequent separation of the excess amines by distillation. For chemical reasons, the excess of amines can be unlimited, but since the excess amines must again be distilled off, it is advisable to limit the excess for reasons of economy. In general, the amines are therefore employed at a 10 to 100% molar excess relative to the epoxide groups of the epoxide compounds. This makes possible that only amine-terminal addition products are obtained.

Examples of suitable amines which can be employed are primary monoamines, such as butylamine, cyclohexylamine, aniline or benzylamine, as well as aliphatic, araliphatic, cycloaliphatic, aromatic mono- or di- and/or polyamines, provided they can be distilled without undergoing decomposition, and provided they contain at least one primary amino group or, when using secondary amines, at least two secondary amino groups to enure that the desired addition product has at least one free primary or secondary amino group per molecule.

Aliphatic di- and/or polyamines are preferably used and examples are ethylene-diamine, diethylenetriamine, triethylenetetramine, tetraethylenepentamine, trimethylhexanediamines, methylpentanediamines, pentaethylenehexamine, 1,2-diaminopropane, 1,3-diaminopropane, 1,2-, 1,3- and 1,4-diaminobutane, 3-(2-aminoethyl)aminopropyl amine, N,N'-bis(3-aminopropyl) ethylene diamine, 1,2-diaminocyclohexane, 1,3-diaminocyclohexane, 1,4-diaminocyclohexane, N-aminoethyl piperazine, N-aminopropyl piperazine, N-aminobutyl piperazine, phenylene diamines, xylene diamines and isophorone diamine or mixtures of these amines.

Examples of the epoxide components that can be employed are all compounds individually or mixed with one another, which are gaseous or liquid at ambient temperature and which contain at least one oxirane group in the molecule.

Since the addition products are employed in solvent-free mixtures which can be processed at ambient temperature and which are self-levelling, such addition products are preferred which have a viscosity as low as feasible. Therefore, the epoxide components are also preferred low-molecular aliphatic, araliphatic, cycloaliphatic, aromatic or heteroaromatics-containing compounds which contain up to two oxirane groups. Examples of these are butyl-, hexyl-, phenyl-, butylphenyl-, nonylphenol-, cresylglycidyl ethers, resorcinol diglycidyl ether, $C_2$–$C_{20}$ carboxylic acid glycidyl esters and ethylene-propylene- or butylene oxide.

Preparation of the addition products takes place by conversion of the reaction partners (optionally under pressure) at temperatures in the range of 20 to 140° C., preferably in the range of 50 to 90° C., and maintaining the reaction mixture for approximately 1 to 5 hours at temperatures in this range. Subsequently, preferably under vacuum, the separation by distillation takes place of the amines that have not been converted.

The amounts of the addition product used in the mixtures of the invention must be such that the amine hydrogen atoms introduced therewith—provided the mixture does not contain further epoxide resin curing agents—are equimolor to the sum of the epoxide groups of the resins and reactive thinners employed. In general, they are in the range of 1 to 25 wt. % relative to the total mixture.

The xylene-formaldehyde resins employed as modification means are low-molecular and low-viscosity, but not volatile products, produced by acid-catalyzed condensation of xylene and formaldehyde. They are known inter alia from Ullmann's Encyklopädie der technischen Chemie, 4th Edition, Vol. 12, p. 542 or Houben-Weyl, Methoden der organischen Chemie, Vol. E 20/Part 3, pp. 1796 to 1798 and are commercially available. It is also known to use these resins as extenders for mixtures of epoxy resin and curing agents, especially to reduce the viscosity of such mixtures. However, these resins have the disadvantage that they drastically lower the mechanical values of cured epoxy resin formulations, in which they are used.

Their use in the mixtures of the invention, in contrast, yielded two surprising results: the mechanical strengths of the cured mixtures, particularly the resistance to impact and the modulus of elasticity are excellent. Compared to conventionally cured epoxy resins, the mixtures have increased elasticity with high final strength and thus offer a long service life.

The optical as well as also the tactile surface quality of the cured mixtures are substantially improved. In contrast to conventional, yellowing and epoxy resin surfaces, which are shiny like grease, the surfaces of the objects of the invention have a colorfast brilliant luster, translucent pigments and coloring filler materials, particularly color glass or color quartz, appear to full advantage and the surfaces are smooth, tack-free and firm to the touch.

It was furthermore found that it is possible to replace up to 60 wt. % of the xylene-formaldehyde resins employed as modification means by other modification means known per se without the loss of the above listed good properties of the binding agents. Thus, it is particularly possible to mix the employed xylene-formaldehyde resins with up to 60% of the total quantity of modification means with mono- or dialkyl naphthalines, especially diisopropyl naphthalines without the surface properties of the resulting mixture being degraded even though severely flawed surfaces are generated with the exclusive use of mono- or dialkyl naphthalines as modification means of epoxy resin mixtures.

Epoxy resins and modification means are per se mixable in any ratio. But, depending on the desired viscosity, the modification means are only employed in amounts of 1 to 20 wt. % relative to the total mixture.

In the mixtures of the invention all polyfunctional epoxide compounds known per se can be used, which contain at least two epoxide groups per molecule. Preferred epoxy resins are polyphenol glycidyl ethers which are liquid at ambient temperature, for example the reaction products of epichlorohydrin and bisphenol A or bisphenol F. Such epoxy resins have an epoxy equivalent of 160 to >700 and the resins can be used singly or in mixtures.

The epoxy resins determine substantially the mechanical properties of the cured mixture and they are therefore also the main component of the binding agent system and are employed in amounts of 5 to 50% by weight of the total mixture.

To decrease the viscosity, epoxide group-containing reactive thinners or mixtures of reactive thinners known per se are added to the mixture. These are non-resinous, liquid monomeric compounds which have at least one 1,2 epoxide group in the molecule. Such reactive thinners are for example known from LEE and NEVILLE, Handbook of Epoxy Resins, McGraw-Hill Book Company, 1967, pp. 13–9 to 13–16. Since with only one epoxide group to impair the mechanical properties of the end product, reactive thinners are preferably used which have two epoxide groups in the molecule. Examples are butadiene-, dimethylpentadiene-, limonin-, divinyl benzene- or vinyl cyclohexane dioxide, diglycidyl ether as well as diglycidyl ethers of aliphatic, araliphatic, cycloaliphatic or aromatic diols or amines, in particular diglycidyl ethers of butanediol, hexanediol, diethylene glycol, resorcinol or aniline.

The amounts of the reactive thinner employed are in the range of 1 to 25% by weight of the total mixture.

The mixture of epoxy resin, reactive thinner, curing agent and modification means can be directly used as such, but, as a rule, additionally up to 80 wt. %, relative to the total mixture, of filler materials and additives are added.

Examples of filler materials are the known reinforcing filler materials, such as chalk, silicates, silicon dioxide, barium sulfate, lithopones or zinc sulfide, but also pigmenting or optically acting filler materials, such as metal powder, mica platelets, zirconium oxide, dihafnium oxide or titanium dioxide can be added.

But the filler materials preferably used for the production of decorative surfaces are colored glass and colored quartz, dyed products based on silicates with a mean grain size in the range of 0.2 to 1.5 mm, as well as zircon sand.

Additive substances, which optionally are used in the mixtures of the invention, are additional curing agent components or additives for curing means, known per se, such as curing accelerators or retarding agents, as well as pigments, levelling agents, defoaming or degassing means.

As additive substances per se are particularly applied accelerators known for the curing of amine cold-curing epoxy resin systems, such as OH containing hydrocarbon resins, phenols, tert. amines, organic acids, novolaks and other compounds containing phenol OH groups.

For the production of the mixtures of the invention, two components are prefabricated by the mixing of the individual components. One component comprises epoxy resin, epoxy group-containing reactive thinners, optionally modification means, such as filler materials and additive substances, but never a curing component of the mixture. The other component contains the isolated epoxy-amine addition product and optionally modification means as well as filler materials and additive substances. The division of the modification means as well as of the fillers and additives into the two components takes place under the main aspect that both components at processing temperature have a similar viscosity in the range of 1000 to 10000 mPas. Both components are stored separately and the mixture of the invention is prepared shortly before use by mixing the two components. The amount of the two components to be mixed are selected so that the amount of the curing agent corresponds stoichiometrically to the quantity of the epoxide groups employed.

After the two components are mixed, the mixture still has a processing time of 0.25 to 2 hours, depending on how it is made up, and then cures thoroughly at ambient temperature to a composition capable of bearing load within one day. This is particularly of importance if multilayer structuring of the surface is required, specifically, if as a pretreatment of the foundation, the same binding means is used as a clear primer without any filler material. The final complete through-curing takes place within 7 to 28 days.

Due to their properties, the mixtures of the invention are preferably suitable for the production of decorative surfaces, particularly of decorative floor coatings and coatings in bathrooms and sanitary blocks. They are useful also for the hand lay-up lamination of formed parts or for the production of composite materials, in which a surface is desired which, in terms of optical and tactile properties, satisfies aesthetic requirements. Such products, for example, are items of sports equipment.

Application of the mixtures of the invention can take place by customary methods, thus by means of brushing, knife coating, rolling, surfacing and filling or spraying. Depending on the choice of the application method, an adaption of the viscosity may possibly be required, which can readily be attained by varying the amounts of the individual mixture components.

In the following examples, there are described several preferred embodiments to illustrate the invention. However, it should be understood that the invention is not intended to be limited to the specific embodiments. The parts specified are in each instance parts by weight.

EXAMPLE 1

To 1.5 mole of triethylene tetramine (TETA), there was added dropwise 1 equivalent of phenylglycidyl ether at 80° C. over 2 hours. The mixture is allowed to undergo secondary reaction for 1 hour at this temperature and the pressure is then decreased at 50 mbar and the temperature is increased until an internal temperature of 250° C. was reached. 0.5 mole of TETA distilled off during this period and after the mixture was cooled, the isolated addition product was obtained as a light yellow liquid with a viscosity at 25° C. of 10200 mPas.

EXAMPLE 2

60 parts of the addition product from Example 1 were mixed with 40 parts xylene-formaldehyde resin with a molecular weight of 270, a viscosity at 25° C. of 50 mPas and a $T_g$ value of −71° C. (Nikanol® Y 51). A curing agent formulation was obtained having a viscosity at 25° C. of 1900 mpas and 50 parts of this curing formulation were mixed with 100 parts of a mixture comprised of 80 parts epoxy resin (diglycidyl ether based on bisphenol A and F with an epoxy equivalent of 173 [Rütapox® 0166/4000]) and 20 parts of hexanedioldiglycidyl ether. The mixture had a pot life of 75 minutes at ambient temperature and it was cured after one day at ambient temperature. The $T_g$ value was 41° C. and the cured product had a faultless surface with a brilliant luster and a slightly yellowish color. Even after UV irradiation with exposure to climate over several days, the color changed only insignificantly and the surface quality not at all.

EXAMPLE 3 (COMPARISON EXAMPLE)

60 parts of the addition product from Example 1 were mixed with 40 parts of benzyl alcohol to obtain a curing agent formulation having a viscosity at 25° C. of 550 mPAs. 60 parts of this curing agent formulation were mixed with 100 parts of a mixture comprised of 80 parts of epoxy resin (diglycidyl ether based on bisphenol A and F with an epoxy equivalent of 173 [Rütapox® 0166/4000]) and 20 parts of hexanediol diglycidyl ether. The mixture had a pot life of 35 minutes at ambient temperature and it was cured after 1 day at ambient temperature. The $T_g$ value was 39° C. and the cured product had a matt, irregular, slightly rough surface and a slightly yellowish color. After UV irradiation over several days with exposure to climate, the color changed only minimally but more strongly than in Example 2. The surface increasingly showed streaks and flotations.

Various modifications of the compositions and process of the invention may be made without departing from the spirit or scope thereof. It is to be understood that the invention is intended to be limited only as defined in the appended claims.

What we claim is:

1. A mixture comprising
    a. 5–50 wt. % of epoxy resin with at least two epoxide groups per molecule,
    b. 1–25 wt. % of reactive thinner comprising epoxide groups,
    c. 1–25 wt. % of epoxy-amine addition product with terminal amino groups,
    d. 1–20 wt. % of modification means,
    e. 0–80 wt. % of filler materials and additives,
    wherein the epoxy-amine addition product is an isolated addition product of one mole of amine and one to two equivalents of at least one epoxide compound having up to two epoxide groups per molecule, and that the modification means is a xylene-formaldehyde resin or a mixture of xylene-formaldehyde resin with up to 60 wt. % of another modification means.

2. A mixture of claim 1, wherein the epoxy-amine addition product is an addition product of one mole of at least one aliphatic polyamine and 1 to 2 equivalents of at least one epoxide compound with up to two epoxide groups per molecule.

3. A mixture of claim 1 wherein the additives are known accelerators for curing amine cold-curing epoxy resin systems.

4. A mixture of claim 1 wherein it contains colored glass or colored quartz as filler material.

5. A mixture of claim 1 wherein it contains zircon sand as a filler material.

6. In the production of decorative surfaces, the improvement comprising using a mixture of claim 1.

7. In the production of decorative base coatings, the improvement comprising using a mixture of claim 1.

8. In the production of coatings in bathrooms and sanitary blocks, the improvement comprising using a mixture of claim 1.

9. In the hand lay-up lamination of formed parts, the improvement comprising using a mixture of claim 1.

10. In the production of composite materials with optically and tactilely aesthetic surfaces, the improvement comprising using a mixture of claim 1.

11. A decorative surface produced from a mixture of claim 1.

* * * * *